(No Model.) 3 Sheets—Sheet 1.

H. W. LIBBEY.
ELECTRIC RAILWAY.

No. 418,373. Patented Dec. 31, 1889.

Witnesses.
George D. Reid
Timothy G. O'Connell

Inventor
Hosea W. Libbey
by Edwin Planta
Attorney.

N. PETERS, Photo-Lithographer, Washington, D. C.

(No Model.) 3 Sheets—Sheet 2.

H. W. LIBBEY.
ELECTRIC RAILWAY.

No. 418,373. Patented Dec. 31, 1889.

Witnesses.
George D. Reid
Timothy G. O'Connell

Inventor.
Hosea W. Libbey
by Edwin Planta
attorney (No Model.) 3 Sheets—Sheet 3.

H. W. LIBBEY.
ELECTRIC RAILWAY.

No. 418,373. Patented Dec. 31, 1889.

Witnesses.
George D. Reid
Timothy G. O'Connell

Inventor.
Hosea W. Libbey
by Edwin Planta
attorney.

UNITED STATES PATENT OFFICE.

HOSEA W. LIBBEY, OF BOSTON, MASSACHUSETTS.

ELECTRIC RAILWAY.

SPECIFICATION forming part of Letters Patent No. 418,373, dated December 31, 1889.

Application filed October 10, 1888. Serial No. 287,713. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Electric Railways, of which the following, taken in connection with the accompanying drawings, is a specification.
The object of my invention is to construct an elevated electric railway and cars for the same particularly adapted for the rapid transit of mail-matter or merchandise.

The invention consists in the peculiar construction of the track and its supports, the construction of the car and the manner of mounting the same, and also in the construction of the switch and the means of shifting a car from an upper to a lower track, or vice versa, all as hereinafter fully described, and pointed out in the claims.

Figure 2:
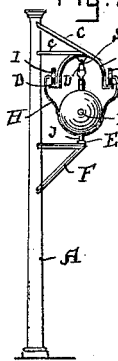
Figure 1:
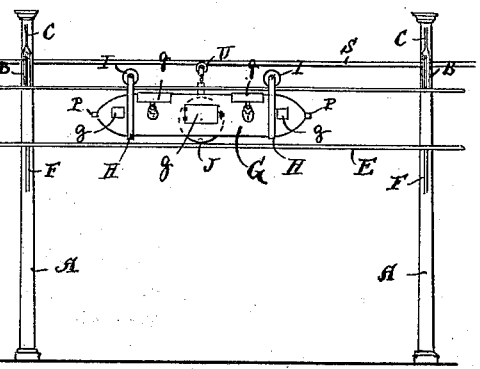
Figure 3:
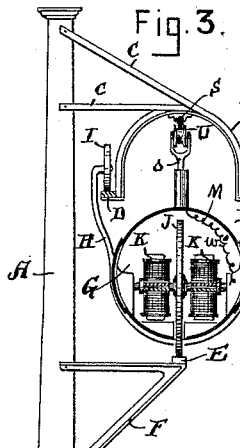
Figure 4:
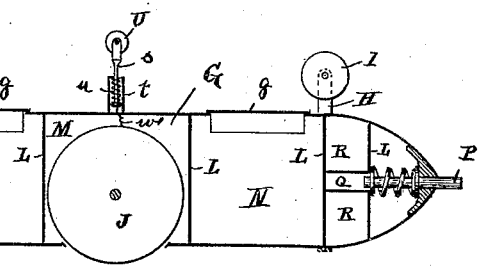
Figures 5, 6:
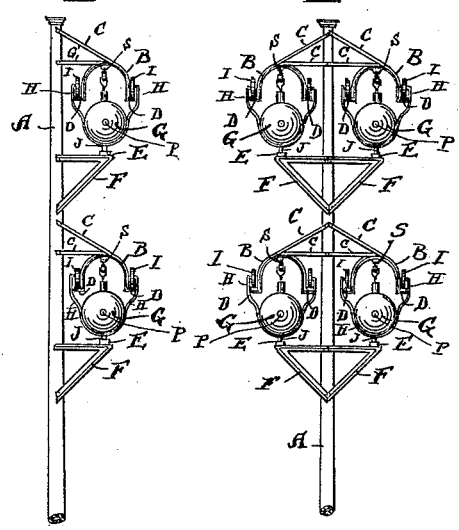
Figure 7:
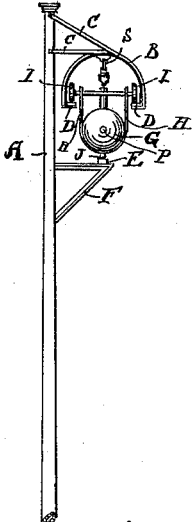
Figure 8:
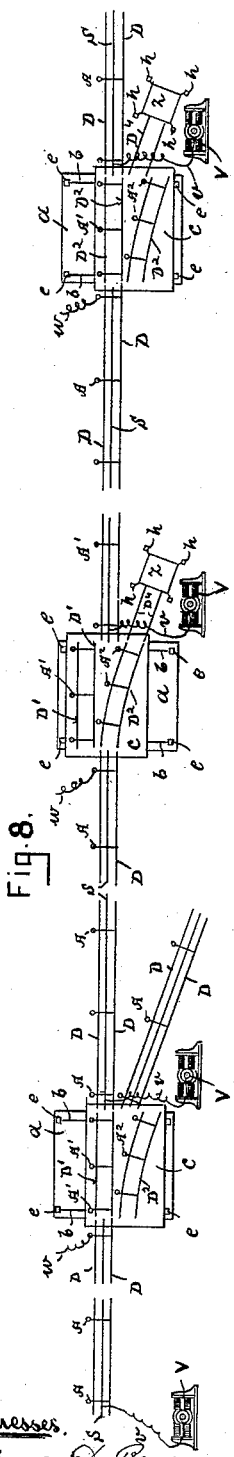
Figure 9:
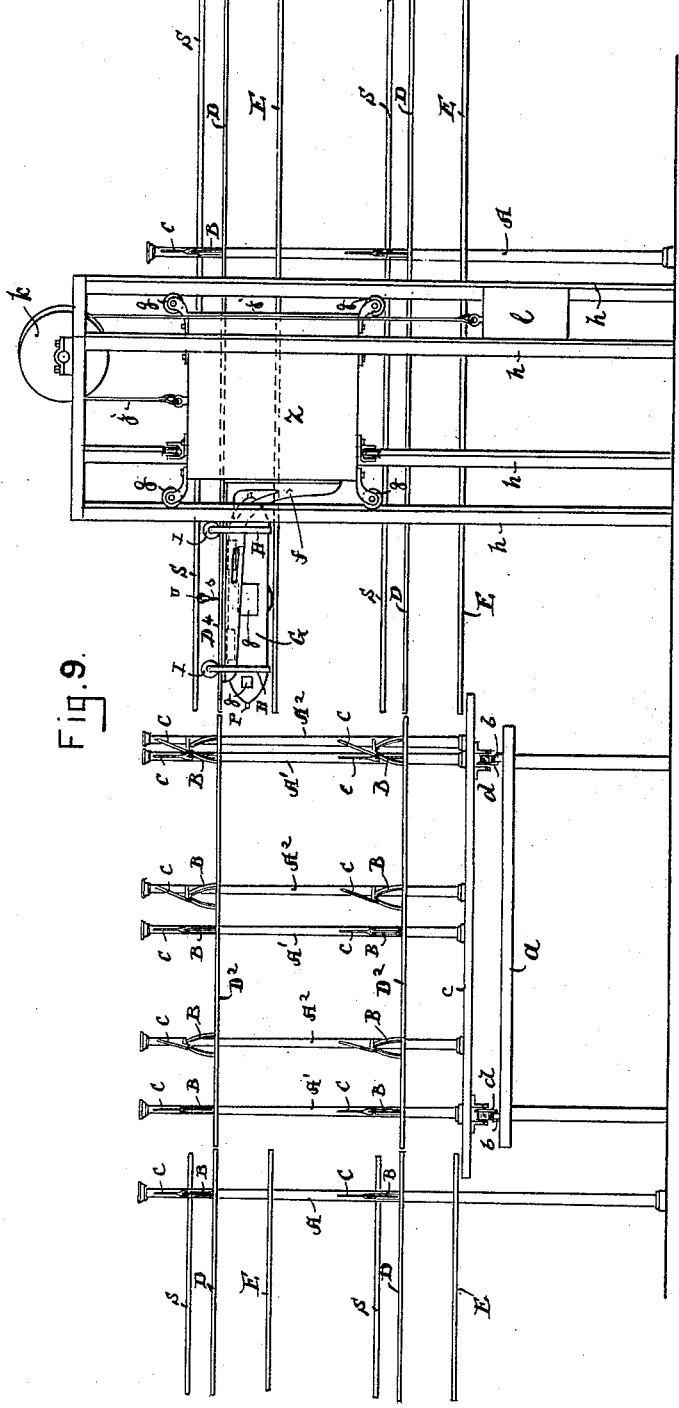
Figure 11:
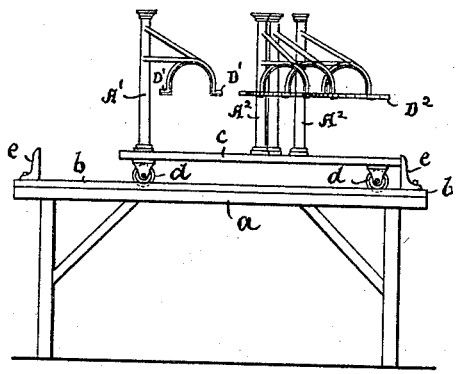
Figure 10:
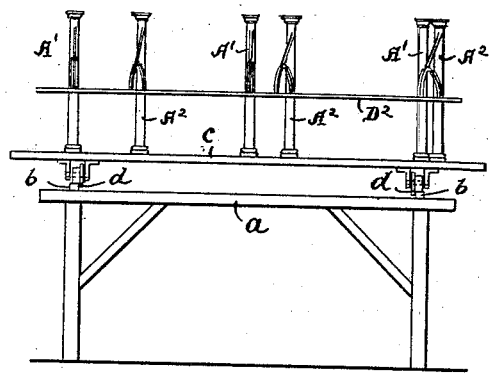
Figure 12:
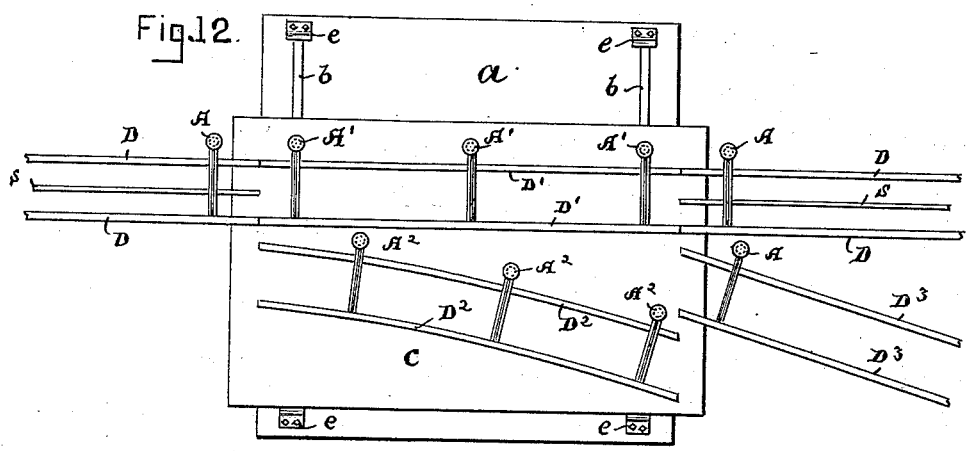
Figure 13:
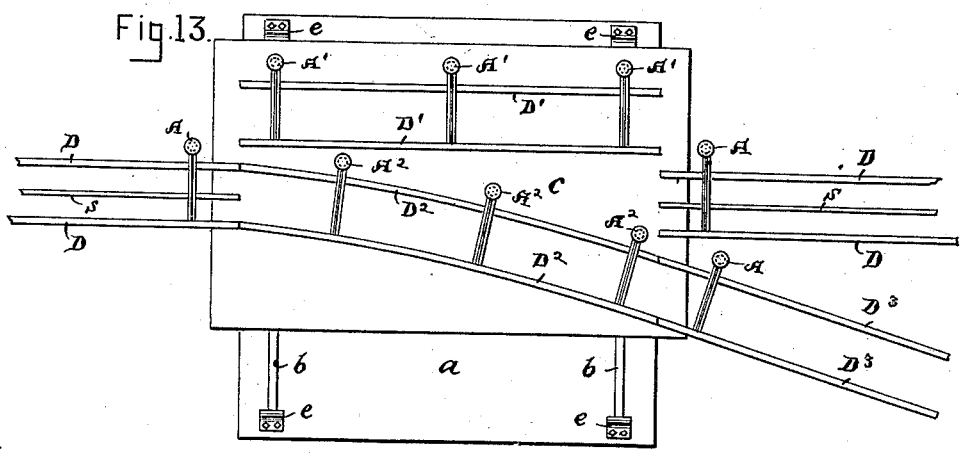

Referring to the accompanying drawings, Figure 1 represents a side elevation of a single-track elevated electric railway and car embodying my invention. Fig. 2 is an end view of the same. Fig. 3 is a similar view, on an enlarged scale, showing the car in section. Fig. 4 is a longitudinal vertical section through the car. Fig. 5 is an end view showing an outward and return track. Fig. 6 is an end view showing two outward and two return tracks. Fig. 7 is an end view showing a modification of the manner of supporting the car. Fig. 8 is a general plan view of a section of the railway, switches, and means for raising and lowering the car. Fig. 9 is a side elevation of a switch and the raising and lowering mechanism, showing a car ready to be shifted from the upper to the lower track. Fig. 10 is a side view of the switch; Fig. 11, an end view of the same. Fig. 12 is a plan or top view of the switch open to the main line. Fig. 13 is a similar view showing the switch open to a branch or siding.

A A represent columns, which are arranged in a single row at suitable distances apart, from each of which is supported one or more arched T-irons B, by means of stays or braces C C, the ends of the T-irons B being bent outward to form a rest or bearing for the rails D. At a suitable distance below the rails D another rail E is provided, said rail being supported by a bracket F, secured to the column A.

G is the car, preferably of cylindrical form, to which are secured two straps or bands H, that pass under the car and up on each side above the rails D, and to each of their upper ends is secured a wheel I, which runs upon the rails D.

The driving-wheel J is mounted in the center of the car and runs upon the rail E. Motion is communicated to the drive-wheel J from an electric motor K, (see Fig. 3,) to which the electric fluid is supplied, as hereinafter described.

The car G is divided into compartments by means of partitions L, the central compartment M being occupied by the drive-wheel J and motor K, the compartments N on either side being intended to receive the mail or other matter to be transported. At each end of the car a buffer or bunter P is provided, the inner end of which when pushed in enters the cylindrical chamber Q, the space R around which can be utilized to carry freight. The several compartments are provided with doors *g g*, which may be arranged at the top, side, or other convenient place and hinged and secured in any suitable manner.

To the under side and in the center of the arched T-iron is secured a flat metal bar S, said bar being insulated from the T-iron, and a wheel U, mounted on the car, is employed to make contact with the bar S, said wheel being mounted on the end of a rod *s*, the lower end of which passes into a cylinder *t* (see Fig. 4) on the top of the car G. A spiral spring *u*, placed around the end of the rod *s* in the cylinder, keeps the wheel U pressed upward, so as to keep it in contact with the bar S.

The electric current is generated by a dynamo-electric machine V (see Fig. 8) and conducted by a wire *v* to the bar S at one end of the track or section thereof, and the other end of the track or section thereof is connected to ground through the arch B, stays C, and posts A, or by wire *w*.

In operation, the bar S being charged with the electric current and the wheel U being in contact with the bar S, the current passes along the bar S to the wheel U, and from thence by wire $w'$ to the electro-motor K, and through the driving-wheel J to the rail E, and thence through the nearest bracket F and post A to the ground; or the rail E might be connected by a wire to the dynamo-machine, so that the circuit would be from the dynamo V through wire $v$ to bar S, through the wheel U, motor K, and wheel J to rail E, and thence by negative wire to the dynamo V.

To switch the cars onto another track, or to the lowering and raising mechanism, I employ a switch constructed as shown in Figs. 10 to 13, in which—

$a$ represents a platform of suitable height provided with rails $b$, and $c$ is a carriage mounted upon wheels $d$, that run on the rail $b$, stops $e$ being provided at each end of the rail to regulate the proper position of the switch. To the carriage $c$ are secured columns $A'$ $A^2$. To the column A are secured rails $D'$, that correspond with the rails D of the main track, and to the columns $A^2$ are secured rails $D^2$, which at one end can be brought into connection with the rails D and at the other end with rails $D^3$ of a branch, siding, or raising and lowering apparatus. It will be seen that by the carriage $c$ being pushed or drawn one way or the other the switch forms connection with the main line or branch, and the switch may be operated by hand or by mechanical means. It will also be seen that between the rails $D'$ $D'$ and $D^2$ $D^2$ the bar S and lower rails E are dispensed with and the car runs on the upper rails alone, the momentum of the car being sufficient to carry it past the switch.

When an outward and a return track are employed, and it is desired to shift the car from one track to the other, the raising and lowering device, as shown in Fig. 9, is employed, in which $D^4$ represents rails carried by brackets $f$, secured to an elevator Z, provided at each corner with wheels $g$, that run against standards $h$. One end of a rope $j$ is connected to the top of the elevator Z. The said rope then passes over a pulley $k$, and is at its other end connected to a weight $l$, which should be sufficient to counterbalance the weight of the elevator and car. As shown in Fig. 9, supposing the upper track to be the outward one and the lower one the return-track, and the car having been switched into the position shown, it is then suspended from the rails $D^4$, and by raising the weight $l$ or drawing down the elevator Z the car G will be brought down on a level with the rails $D^2$ of the lower or return track of the switch, and can then be pushed off onto the main or return track after the motor has been adjusted to run in the proper direction.

Should the distance between one station and another be so great that the electricity generated by a single dynamo at one end is not sufficient, then the bar S may be supplied at intermediate stations in any suitable manner, as may be required, and instead of employing the bar S for conducting the positive current and the rail E for the negative the current may be reversed, in which case the motor would also have to be reversed.

What I claim as my invention is—

1. An elevated electric railway and support, consisting of a single row of columns A, each having an arch B, secured to the column by braces C and carrying the rail D, from which the car is suspended, and also an upper bar S, the bracket F, secured to the column and carrying the rail E, the rail-bar S being the positive and the rail E the negative conductor of electricity, or vice versa, substantially as set forth.

2. In an elevated electric railway, two upper side rails D D, from which the car is suspended, in combination with a lower rail E, upon which the driving-wheel of the car runs, and a bar S, situated between but above the level of the rails D, the bars S being the positive and the rail E the negative conductor of electricity, or vice versa, substantially as set forth.

3. In an electric-railway system, two main rails supported upon arches carried by a single row of posts, in combination with an upper bar, a lower rail, and a car having an electric motor, whereby the car is suspended by the two main rails, and an electric circuit is formed between the upper bar, the motor in the car, and the lower rail, substantially as set forth.

4. In combination with an elevated electric railway, a car divided by partitions into compartments and provided at each end with a buffer and in the center with a driving-wheel and motor, the latter being connected to a yielding contact-roller, and the car being carried by wheels running on two side rails arranged above the car, substantially as shown and described.

5. In combination with an electric railway such as described, the car G, provided with wheels I, driving-wheel J, motor K, yielding contact-roller U, and buffers P, substantially as shown and described.

6. In an electric railway, a switch consisting of a carriage mounted upon a platform and provided with two rows of columns $A'$ $A^2$, to one of which is secured the rails connecting the main line, and to the other the rails connecting to the branch, each set of rails being supported by a separate row of posts, so that one set of rails will make connection with the main line and the other set with a branch or siding, substantially as shown and described.

7. In combination with an elevated electric railway, a switch consisting of a platform $a$, provided with rails $b$, and stops $e$, a carriage $c$, provided with a row of posts $A'$, supporting rails $D'$, for making connection with the main line, and a row of posts $A^2$, supporting rails $D^2$, for making connection with a branch or siding, substantially as shown and described.

8. In an electric-railway system, two main supporting-rails, and an upper bar carried by arches secured to a single row of posts, in combination with a lower rail supported by a bracket from the posts, and a car suspended from the main rails and having an electric motor and driving-wheel running upon said lower rail, and a contact-wheel electrically connecting the upper bar to the motor, substantially as shown and described.

9. In combination with an elevated electric railway, having one track below the other, a device for shifting the cars from one track to the other, consisting of an elevator Z, guides $h$, rope $j$, pulley $k$, and counterweight $l$, the elevator being provided with brackets $f$, carrying rails $D^4$, upon which the car to be shifted is run, substantially as shown and described.

10. An elevated electric railway, provided with an upper and lower track wherein the rails and electrical conductors are supported by a single row of columns, in combination with switches mounted upon carriages, and a device for shifting the cars from one track to the other, substantially as set forth.

In testimony whereof I have signed my name to this specification, in the presence of two subscribing witnesses, on this 30th day of August, A. D. 1888.

HOSEA W. LIBBEY.

Witnesses:
CHAS. STEERE,
EDWIN PLANTA.